(12) United States Patent
Bivolarsky et al.

(10) Patent No.: US 11,525,743 B2
(45) Date of Patent: Dec. 13, 2022

(54) ACOUSTIC TEMPERATURE MEASUREMENT IN LAYERED ENVIRONMENTS

(71) Applicant: PERCEPTIVE SENSOR TECHNOLOGIES, INC., Tucson, AZ (US)

(72) Inventors: Lazar Bivolarsky, Cupertino, CA (US); Joel D. Burcham, Huntsville, AL (US); James M. Heim, Tucson, AZ (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 17/543,152

(22) Filed: Dec. 6, 2021

(65) Prior Publication Data

US 2022/0178767 A1     Jun. 9, 2022

Related U.S. Application Data

(60) Provisional application No. 63/121,755, filed on Dec. 4, 2020.

(51) Int. Cl.
| | | |
|---|---|---|
| *G01K 13/12* | (2006.01) | |
| *G01K 11/22* | (2006.01) | |
| *G01B 17/02* | (2006.01) | |

(52) U.S. Cl.
CPC .............. *G01K 11/22* (2013.01); *G01B 17/02* (2013.01)

(58) Field of Classification Search
USPC ........................ 374/117–119, 45, 7, 185, 183
See application file for complete search history.

(56) References Cited

U.S. PATENT DOCUMENTS

| | | | |
|---|---|---|---|
| 2,449,054 A | 9/1948 | Chantlin | 177/311 |
| 3,019,650 A | 2/1962 | Worswick | 73/290 |

(Continued)

FOREIGN PATENT DOCUMENTS

| | | | | |
|---|---|---|---|---|
| CN | 105548370 | 5/2016 | ............ | G01N 29/24 |
| DE | 10 2010 029 254 | 12/2011 | ............... | F01N 3/10 |

(Continued)

OTHER PUBLICATIONS

B. Vermeersch, G. De Mey "Influence of substrate thickness on thermal impedance of microelectronic structures", Microelectronics Reliability, 47, 437-443, 2007. (Year: 2007).*

(Continued)

*Primary Examiner* — Lisa M Caputo
*Assistant Examiner* — Nasir U. Ahmed
(74) *Attorney, Agent, or Firm* — Hayes Soloway P.C.

(57) ABSTRACT

An apparatus for measuring temperature in a layered environment includes an ultrasound transducer positioned perpendicular to an exterior surface of a first layer. The ultrasound transducer is in communication with a computer processor, power source, and computer-readable memory. The processor is configured to: measure a thickness of the first layer; measure an exterior surface temperature of the first layer; calculate an impedance of the first layer based on the thickness and the exterior surface temperature; and calculate an interior surface temperature of the first layer based on the impedance and the exterior surface temperature of the first layer.

20 Claims, 5 Drawing Sheets

(56) References Cited

U.S. PATENT DOCUMENTS

| | | | | |
|---|---|---|---|---|
| 3,703,829 | A | 11/1972 | Dougherty | 73/290 |
| 3,837,218 | A | 9/1974 | Flambard et al. | G01N 29/00 |
| 3,971,962 | A | 7/1976 | Green | H01L 41/08 |
| 4,065,958 | A | 1/1978 | Krylova et al. | G01N 29/02 |
| 4,118,983 | A | 10/1978 | Braznikov | G01F 23/28 |
| 4,121,468 | A | 10/1978 | Glover et al. | G01N 29/04 |
| 4,182,177 | A | 1/1980 | Prough | 73/290 |
| 4,280,126 | A | 7/1981 | White | 340/621 |
| 4,320,659 | A | 3/1982 | Lynnworth et al. | G01N 29/02 |
| 4,501,146 | A | 2/1985 | Greenhalgh | G01F 23/28 |
| 4,580,448 | A | 4/1986 | Skrgatic | G01F 23/28 |
| 4,596,266 | A | 6/1986 | Kinghorn et al. | B65D 88/38 |
| 4,676,098 | A | 6/1987 | Erlenkämper et al. | 73/290 |
| 4,852,416 | A | 8/1989 | Boone et al. | H04R 1/02 |
| 4,934,191 | A | 6/1990 | Kroening et al. | 73/592 |
| 4,954,997 | A | 9/1990 | Dieulesaint et al. | G08B 21/00 |
| 4,977,780 | A | 12/1990 | Machida et al. | G01N 29/04 |
| 5,015,995 | A | 5/1991 | Holroyd | 340/621 |
| 5,038,611 | A | 8/1991 | Weldon et al. | 73/290 |
| 5,148,700 | A | 9/1992 | King | G01N 15/00 |
| 5,195,058 | A | 3/1993 | Simon | G01S 15/02 |
| 5,295,120 | A | 3/1994 | McShane | 367/188 |
| 5,325,727 | A | 7/1994 | Miller et al. | G01F 1/34 |
| 5,415,033 | A | 5/1995 | Maresca, Jr. et al. | 73/40.5 |
| 5,438,868 | A | 8/1995 | Holden et al. | 73/290 |
| 5,460,046 | A | 10/1995 | Maltby et al. | G01N 29/24 |
| 5,469,749 | A | 11/1995 | Shimada et al. | G01F 1/38 |
| 5,604,314 | A | 2/1997 | Grahn | G01L 5/16 |
| 5,770,806 | A | 6/1998 | Hiismaki | G01F 1/662 |
| 5,821,427 | A | 10/1998 | Byrd | G01F 1/66 |
| 6,035,903 | A | 3/2000 | Few et al. | B65B 1/04 |
| 6,151,956 | A | 11/2000 | Takahashi et al. | G01N 3/56 |
| 6,157,894 | A | 12/2000 | Hess et al. | 702/54 |
| 6,192,751 | B1 | 2/2001 | Stein et al. | G08B 21/00 |
| 6,330,831 | B1 | 12/2001 | Lynnworth et al. | 73/861.28 |
| 6,368,281 | B1 | 4/2002 | Solomon et al. | A61B 8/14 |
| 6,443,006 | B1 | 9/2002 | Degrave | G02F 23/00 |
| 6,470,744 | B1 | 10/2002 | Usui et al. | 73/290 |
| 6,481,287 | B1 | 11/2002 | Ashworth et al. | G01K 11/24 |
| 6,513,385 | B1 | 2/2003 | Han | G01N 29/00 |
| 6,575,043 | B1 | 6/2003 | Huang et al. | G01F 1/66 |
| 6,578,424 | B1 | 6/2003 | Ziola et al. | G01N 29/00 |
| 6,631,639 | B1 | 10/2003 | Dam et al. | 73/290 |
| 6,672,163 | B2 | 1/2004 | Han et al. | G01V 1/28 |
| 6,925,868 | B2 | 8/2005 | Young et al. | 73/290 |
| 6,938,488 | B2 | 9/2005 | Diaz et al. | 73/597 |
| 7,085,391 | B1 | 8/2006 | Yamaya | G10H 1/00 |
| 7,114,375 | B2 | 10/2006 | Panetta et al. | 73/61.75 |
| 7,246,522 | B1 | 7/2007 | Diaz et al. | 73/597 |
| 7,299,136 | B2 | 11/2007 | DiFoggio et al. | 702/22 |
| 7,330,797 | B2 | 2/2008 | Bailey et al. | G01F 23/00 |
| 7,363,174 | B2 | 4/2008 | Kishiro et al. | G01F 25/10 |
| 7,624,650 | B2 | 12/2009 | Gysling et al. | G01F 1/66 |
| 7,624,651 | B2 | 12/2009 | Fernald et al. | G01F 1/66 |
| 7,656,747 | B2 | 2/2010 | Mandal et al. | G01V 1/44 |
| 7,694,570 | B1 | 4/2010 | Dam et al. | 73/644 |
| 7,962,293 | B2 | 6/2011 | Gysling | G01F 1/76 |
| 7,966,882 | B2 | 6/2011 | Greenwood | 73/597 |
| 8,683,882 | B2 | 4/2014 | Jackson | G01N 9/24 |
| 8,820,182 | B2 | 9/2014 | Nikolay Nikolov et al. | H04Q 9/00 |
| 8,850,882 | B2 | 10/2014 | Qu et al. | G01F 23/296 |
| 8,915,145 | B1 | 12/2014 | Van Orsdol | G01F 1/74 |
| 9,057,677 | B2 | 6/2015 | Field | G01N 29/032 |
| 9,557,208 | B2 | 1/2017 | Kuroda et al. | G01F 23/28 |
| 9,891,085 | B2 | 2/2018 | Muhammad et al. | G01F 1/88 |
| 10,122,051 | B2 | 11/2018 | Kuhne et al. | H01M 10/484 |
| 10,458,871 | B2 | 10/2019 | Norli | G01L 11/04 |
| 10,794,871 | B1 | 10/2020 | Blackshire et al. | G01N 29/265 |
| 11,020,793 | B2 | 6/2021 | De Monte et al. | B22D 2/006 |
| 2002/0170753 | A1 | 11/2002 | Clare | G01G 19/22 |
| 2004/0079150 | A1 | 4/2004 | Breed et al. | 73/291 |
| 2004/0173021 | A1* | 9/2004 | Lizon | G01F 23/2967 73/290 V |
| 2004/0226615 | A1 | 11/2004 | Morikawa et al. | G05D 7/06 |
| 2005/0055136 | A1 | 3/2005 | Hofmann et al. | 700/273 |
| 2005/0128873 | A1 | 6/2005 | LaBry | G01V 1/40 |
| 2005/0178198 | A1 | 8/2005 | Freger et al. | 73/290 |
| 2005/0247070 | A1 | 11/2005 | Arshansky et al. | 62/77 |
| 2006/0196224 | A1 | 9/2006 | Esslinger | 62/509 |
| 2007/0068253 | A1 | 3/2007 | Carodiskey | A61B 6/00 |
| 2007/0157737 | A1 | 7/2007 | Gysling et al. | G01F 1/667 |
| 2007/0205907 | A1 | 9/2007 | Schenk, Jr. | G08B 21/00 |
| 2008/0092623 | A1 | 4/2008 | Lynch et al. | G01N 29/02 |
| 2009/0143681 | A1 | 6/2009 | Jurvelin et al. | A61B 8/00 |
| 2010/0111133 | A1 | 5/2010 | Yuhas et al. | G01K 17/00 |
| 2010/0199779 | A1 | 8/2010 | Liu et al. | G01F 1/663 |
| 2010/0242593 | A1 | 9/2010 | Lagergren et al. | G01F 23/296 |
| 2011/0029262 | A1 | 2/2011 | Barkhouse | 702/55 |
| 2011/0072904 | A1 | 3/2011 | Lam et al. | G01N 29/04 |
| 2011/0120218 | A1 | 5/2011 | Aldridge | 73/290 |
| 2011/0239769 | A1 | 10/2011 | Schmitt et al. | G01N 29/02 |
| 2011/0271769 | A1 | 11/2011 | Kippersund et al. | G01F 1/66 |
| 2011/0284288 | A1 | 11/2011 | Sawyer et al. | E21B 49/005 |
| 2012/0024067 | A1 | 2/2012 | Oberdoerfer et al. | G01N 29/00 |
| 2012/0055239 | A1 | 3/2012 | Sinha | G01N 29/00 |
| 2012/0259560 | A1 | 10/2012 | Woltring et al. | 702/55 |
| 2012/0262472 | A1 | 10/2012 | Garr et al. | G06T 11/206 |
| 2012/0281096 | A1 | 11/2012 | Gellaboina et al. | G01S 15/89 |
| 2013/0002443 | A1 | 1/2013 | Breed et al. | G08B 21/00 |
| 2013/0068027 | A1 | 3/2013 | Sullivan et al. | G01N 29/04 |
| 2013/0080081 | A1 | 3/2013 | Dugger et al. | G01F 1/663 |
| 2013/0090575 | A1 | 4/2013 | Rupp et al. | A61N 7/00 |
| 2013/0120155 | A1 | 5/2013 | Hagg | G08C 19/16 |
| 2013/0128035 | A1 | 5/2013 | Johns et al. | 348/135 |
| 2013/0213714 | A1 | 8/2013 | Fuida | E21B 49/00 |
| 2014/0020478 | A1 | 1/2014 | Ao et al. | G01F 1/66 |
| 2014/0027455 | A1 | 1/2014 | Castellano et al. | B65D 88/34 |
| 2014/0076631 | A1 | 3/2014 | Dunki-Jacobs et al. | E03C 1/02 |
| 2014/0107435 | A1 | 4/2014 | Sharf et al. | A61B 8/00 |
| 2014/0223992 | A1 | 8/2014 | Harper et al. | G01F 25/0084 |
| 2014/0301902 | A1 | 10/2014 | Fernald et al. | B01J 19/10 |
| 2014/0375169 | A1 | 12/2014 | Na et al. | H01L 41/08 |
| 2015/0075278 | A1 | 3/2015 | Dockendorff et al. | G01F 23/296 |
| 2015/0212045 | A1 | 7/2015 | Raykhman et al. | G01F 1/74 |
| 2015/0247751 | A1 | 9/2015 | Kutlik et al. | G01F 23/2962 |
| 2015/0260003 | A1 | 9/2015 | McHugh et al. | E21B 33/076 |
| 2015/0276463 | A1 | 10/2015 | Milne et al. | G01F 23/296 |
| 2015/0369647 | A1 | 12/2015 | Kumar et al. | G01F 23/284 |
| 2016/0025545 | A1 | 1/2016 | Saltzgiver et al. | G01F 23/263 |
| 2016/0041024 | A1 | 2/2016 | Reimer et al. | G01F 23/296 |
| 2016/0108730 | A1 | 4/2016 | Fanini et al. | E21B 49/08 |
| 2016/0146653 | A1 | 5/2016 | Skelding | E21B 21/01 |
| 2016/0169839 | A1* | 6/2016 | Gottlieb | G01N 29/26 367/7 |
| 2016/0216141 | A1 | 7/2016 | Leaders et al. | G01F 1/66 |
| 2016/0320226 | A1 | 11/2016 | Schaefer et al. | G01F 23/296 |
| 2017/0002954 | A1 | 1/2017 | Brown et al. | F16K 37/0058 |
| 2017/0010144 | A1 | 1/2017 | Lenner et al. | G01F 23/296 |
| 2017/0010145 | A1 | 1/2017 | Lenner et al. | G01F 23/2962 |
| 2017/0010146 | A1 | 1/2017 | Kassubek et al. | G01F 23/296 |
| 2017/0059389 | A1 | 3/2017 | Moore et al. | G01F 23/2968 |
| 2017/0082650 | A1 | 3/2017 | Hies et al. | G01F 25/0007 |
| 2017/0087526 | A1 | 3/2017 | Luharuka | B01F 15/00 |
| 2017/0102095 | A1 | 4/2017 | Kunita et al. | F16K 37/0091 |
| 2017/0097322 | A1 | 6/2017 | Giese et al. | G01N 29/07 |
| 2017/0199295 | A1 | 7/2017 | Mandal | G01V 1/50 |
| 2017/0202595 | A1* | 7/2017 | Shelton, IV | A61B 18/1445 |
| 2017/0239741 | A1 | 8/2017 | Furuta | B23H 1/10 |
| 2017/0268915 | A1 | 9/2017 | Gestner et al. | G01F 1/66 |
| 2017/0309989 | A1 | 10/2017 | Waelde et al. | H01Q 1/225 |
| 2018/0035603 | A1 | 2/2018 | Kremmer et al. | A01C 7/20 |
| 2018/0044159 | A1 | 2/2018 | Crouse et al. | B67D 1/0406 |
| 2018/0080809 | A1 | 3/2018 | Tokarev et al. | G01F 23/2965 |
| 2018/0149505 | A1 | 5/2018 | Ploss et al. | G01F 1/66 |
| 2018/0266874 | A1 | 9/2018 | Montoya et al. | G01F 23/68 |
| 2018/0299317 | A1 | 10/2018 | Truong et al. | G01F 23/2925 |
| 2018/0306628 | A1 | 10/2018 | Parrott et al. | G01F 17/00 |
| 2018/0348169 | A1 | 12/2018 | Lee et al. | G01N 29/11 |
| 2019/0011304 | A1 | 1/2019 | Cunningham et al. | G01F 17/00 |
| 2019/0063984 | A1 | 2/2019 | Bowley | G01F 23/2962 |

(56) References Cited

U.S. PATENT DOCUMENTS

| | | | |
|---|---|---|---|
| 2019/0078927 A1 | 3/2019 | Takayama et al. | ............................ G01F 23/2965 |
| 2019/0137310 A1 | 5/2019 | Xiao et al. | ................. G01F 1/06 |
| 2019/0195629 A1 | 6/2019 | Vaissiere | .................. G01C 9/00 |
| 2019/0195830 A1 | 6/2019 | Tamura et al. | |
| 2019/0272496 A1 | 9/2019 | Moeller | ............... G06Q 10/087 |
| 2020/0018628 A1 | 1/2020 | Head et al. | ........... G21C 17/022 |
| 2020/0182736 A1 | 6/2020 | Kim et al. | ........... G01M 3/2807 |
| 2020/0378283 A1 | 12/2020 | Zhang et al. | ........... F01M 11/10 |
| 2020/0378812 A1 | 12/2020 | Heim | ....................... G01F 1/667 |
| 2020/0378818 A1 | 12/2020 | Heim et al. | ............ G01F 23/296 |
| 2021/0382014 A1 | 12/2021 | Xu et al. | ................. G01N 29/24 |
| 2022/0178879 A1 | 6/2022 | Bivolarsky et al. | .. G02N 29/028 |
| 2022/0178881 A1 | 6/2022 | Bivolarsky et al. | .... G01N 29/04 |

FOREIGN PATENT DOCUMENTS

| | | | | |
|---|---|---|---|---|
| EP | 2450701 | | 5/2012 | ............. G01N 29/22 |
| EP | 2962096 | | 8/2019 | ............. G01L 1/255 |
| EP | 2962096 | B1 * | 8/2019 | ............. G01L 1/255 |
| GB | 2192717 | | 1/1990 | ............. G01N 29/00 |
| KR | 200174618 | | 3/2000 | ............. G01N 29/24 |
| SU | WO 87/04793 | | 8/1987 | ............. G01N 29/00 |
| WO | WO 8809895 | | 12/1988 | ............. F16K 37/00 |
| WO | WO 2007/149605 | | 12/2007 | |
| WO | WO 2014/167471 | | 10/2014 | ............. G01F 23/30 |
| WO | WO 2020/136945 | | 7/2020 | ........... G01F 23/296 |

OTHER PUBLICATIONS

Amjad, Umar et al, "Advanced signal processing technique for damage detection in steel tubes" Proceedings of SPIE, Health Monitoring of Structural and Biological Systems 2016, 980511 (Apr. 1, 2016);14 pgs.

Amjad, Umar et al. "Change in time-to-flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018),10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" *Ultrasoncis* vol. 62 (2015) pp. 223-236, Jun. 11, 2015, 14 pgs.

Amjad, Umar et al., "Detection and quantification of diameter reduction due to corrosion in reinforcing steel bars" *Structural Health Monitoring* 2015, vol. 14(5) 532-543, 12 pgs.

Amjad, Umar et al., "Detection and quantification of delamination in laminated plates from the phase of appropriate guided wave modes" *Optical Engineering* 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, http://www.dw.com/en/gigantic-druzhba-oil-pipeline-paralyzed-for-weeks/a-48638989.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Luck, Marissa "Deer Park fire a 'blemish' for the petrochemical industry's image" *Houston Chronicle*, Mar. 26, 2019, 3 pages https://www.houstonchronicle.com/business/energy/article/Deer-Park-fire-a-blemish-for-the-image-of-13717661.php.

Pandey, "Ultrasonic attenuation in condensed matter", Dissertation for V.B.S. Purvanchal University, 2009, Chapter 1, 36 pgs.

Pluta et al., "Stress Dependent Dispersion Relations of Acoustic Waves Travelling on a Chain of Point Masses Connected by Anharmonic Linear and Torsional Springs" *International Congress on Ultrasonics* AIP Conf. Proc. 1433, 471-474 (2012); 5 pgs.

Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.

"TOPS Terminal Operating Practices Symposium" Program Agenda, Apr. 11, 2018, 1 page.

Zadler, et al., "Resonant Ultrasound Spectroscopy: theory and application", Geophysical Journal International, vol. 156, Issue 1, Jan. 2004, pp. 154-169.

Examination Report No. 1 issued in Australian Application No. 2020283140 dated Jan. 4, 2022, 6 pgs.

International Search Report and Written Opinion issued in PCT/US20/35404, dated Aug. 24, 2020, 11 pages.

Examination Report No. 1 issued in Australian Patent Application No. 2020302919, dated Feb. 15, 2022, 4 pgs.

International Search Report and Written Opinion issued in PCT/US20/39966, dated Sep. 18, 2020, 13 pages.

International Preliminary Report on Patentability issued in PCT/US20/35404 dated Nov. 16, 2021, 8 pgs.

International Preliminary Report on Patentability issued in PCT/US20/39966 dated Dec. 28, 2021, 10 pgs.

Notice of Allowance issued in U.S. Appl. No. 16/888,469, dated Dec. 23, 2020, 16 pgs.

Notice of Allowance issued in U.S. Appl. No. 17/148,122 dated Jun. 16, 2021, 8 pgs.

Notice of Allowance issued in U.S. Appl. No. 16/914,092 dated Oct. 28, 2021, 14 pgs.

Office Action issued in Canadian Patent Application No. 3,140,008, dated Feb. 14, 2022, 4 pgs.

Office Action issued in U.S. Appl. No. 16/888,469, dated Aug. 5, 2020, 8 pages.

Office Action issued in U.S. Appl. No. 16/888,469, dated Sep. 8, 2020, 20 pages.

Office Action issued in U.S. Appl. No. 16/914,092, dated Nov. 10, 2020, 22 pgs.

Office Action issued in U.S. Appl. No. 16/914,092, dated Mar. 1, 2021, 25 pgs.

Office Action issued in U.S. Appl. No. 16/914,092, dated Jun. 24, 2021, 24 pgs.

Office Action issued in U.S. Appl. No. 17/148,122, dated Mar. 2, 2021, 26 pgs.

U.S. Appl. No. 17/540,021, filed Dec. 1, 2021, Heim et al.
U.S. Appl. No. 17/541,036, filed Dec. 2, 2021, Heim et al.
U.S. Appl. No. 17/542,814, filed Dec. 6, 2021, Bivolarsky et al.
U.S. Appl. No. 17/542,461, filed Dec. 5, 2021, Burcham et al.
U.S. Appl. No. 17/542,465, filed Dec. 5, 2021, Bivolarsky et al.
U.S. Appl. No. 17/542,872, filed Dec. 6, 2021, Bivolarsky et al.
U.S. Appl. No. 17/543,200, filed Dec. 6, 2021, Bivolarsky et al.
U.S. Appl. No. 17/542,462, filed Dec. 5, 2021, Bivolarsky et al.
U.S. Appl. No. 17/566,020, filed Dec. 30, 2021, Bivolarsky et al.

International Search Report and Written Opinion issued in PCT/US21/61962 dated Feb. 16, 2022, 9 pgs.

International Search Report and Written Opinion issued in PCT/US21/61924 dated Feb. 16, 2022, 9 pgs.

International Search Report and Written Opinion issued in PCT/US21/62010 dated Feb. 16, 2022, 9 pgs.

International Search Report and Written Opinion issued in PCT/US21/61970 dated Feb. 18, 2022, 17 pgs.

International Search Report and Written Opinion issued in PCT/US21/61925 dated Feb. 18, 2022, 9 pgs.

International Search Report and Written Opinion issued in PCT/US21/61646 dated Feb. 25, 2022, 9 pgs.

International Search Report and Written Opinion issued in PCT/US21/65664 dated Mar. 11, 2022, 9 pgs.

International Search Report and Written Opinion issued in PCT/US21/62001 dated Mar. 9, 2022, 9 pgs.

(56) References Cited

OTHER PUBLICATIONS

International Search Report and Written Opinion issued in PCT/US21/61926 dated Mar. 8, 2022, 9 pgs.
Notice of Acceptance issued in Australian Application No. 2020302919 dated Mar. 2, 2022, 4 pgs.
Notice of Acceptance issued in Australian Application No. 2020283140 dated Mar. 30, 2022, 4 pgs.
Notice of Allowance issued in Canadian Application No. 3,140,008 dated May 5, 2022, 1 pg.
Office Action issued in Australian Patent Application No. 2020283140, dated Mar. 18, 2022, 5 pgs.
Office Action issued in U.S. Appl. No. 17/543,200, dated Mar. 9, 2022, 8 pages.
Office Action issued in U.S. Appl. No. 17/542,461, dated Mar. 10, 2022, 18 pages.
Office Action issued in U.S. Appl. No. 17/542,465, dated Mar. 11, 2022, 22 pages.
Office Action issued in U.S. Appl. No. 17/542,872, dated Mar. 17, 2022, 21 pages.
Office Action issued in U.S. Appl. No. 17/566,020, dated Mar. 18, 2022, 20 pages.
Office Action issued in U.S. Appl. No. 17/541,036, dated Mar. 31, 2022, 22 pages.
Office Action issued in U.S. Appl. No. 17/542,814, dated Apr. 25, 2022, 21 pages.
Vermeersch, "Influence of substrate thickness on thermal impedance of microelectronic structures", Microelectronics Reliability, 47, 2007, pp. 437-443.
Office Action issued in U.S. Appl. No. 17/542,462, dated May 27, 2022, 28 pages.
Office Action issued in U.S. Appl. No. 17/542,461, dated Jun. 27, 2022, 13 pages.
Office Action issued in U.S. Appl. No. 17/566,020, dated Jul. 12, 2022, 20 pages.
Office Action issued in U.S. Appl. No. 17/543,200, dated Jul. 20, 2022, 25 pages.
Office Action issued in U.S. Appl. No. 17/746,622, dated Jul. 22, 2022, 19 pages.
Office Action issued in U.S. Appl. No. 17/541,036, dated Aug. 9, 2022, 22 pages.
Office Action issued in U.S. Appl. No. 17/746,640, dated Aug. 18, 2022, 19 pages.
Notice of Allowance issued in U.S. Appl. No. 17/542,465, dated Jul. 11, 2022, 18 pages.
Notice of Allowance issued in U.S. Appl. No. 17/542,872, dated Jul. 11, 2022, 13 pages.
Office Action issued in U.S. Appl. No. 17/542,814, dated Aug. 26, 2022, 22 pages.
Office Action issued in U.S. Appl. No. 17/540,021, dated Sep. 15, 2022, 40 pages.
Notice of Allowance issued in U.S. Appl. No. 17/542,461, dated Oct. 12, 2022, 9 pages.
Notice of Allowance issued in U.S. Appl. No. 17/543,200, dated Nov. 3, 2022, 16 pages.

* cited by examiner

ACOUSTIC TEMPERATURE MEASUREMENT IN LAYERED ENVIRONMENTS

CROSS REFERENCE TO RELATED APPLICATION

This application claims benefit of U.S. Provisional Application Ser. No. 63/121,755 filed Dec. 4, 2020 and titled "Acoustic Temperature Measurement in Layered Environments", the entire disclosure of which is incorporated herein by reference.

FIELD OF THE DISCLOSURE

The present disclosure is generally related to systems and methods for measuring temperature and more particularly is related to systems and methods for measuring temperature in layered environments.

BACKGROUND OF THE DISCLOSURE

Temperature measurement of a material is of paramount importance in determining other physical or any other properties of the material as well as in many processes. For materials enclosed within tubes, conduits, hoses, and other vessels, direct measurement of the temperature requires invasive measurement techniques, which cannot be performed without sensors located within the vessel. In many cases the temperature varies throughout the volume of the enclosure and creating accurate temperature measurement requires multiple invasive procedures which is not possible in uninterrupted processed and such measurement would interfere with process often rendering the measurement impossible.

Many investigators have looked at ways of measuring temperature non-invasively. Possible methods have included impedance tomography, microwave radiometry, and magnetic resonance imaging (MRI). MRI temperature imaging appears to have the required accuracy and spatial resolution for many thermal therapy scenarios, but it is expensive, requires a fixed installation and may be difficult to use. Nevertheless, at present MRI is the most advanced technology for non-invasive monitoring of thermal properties. However, MRI is not suitable for a number of industrial processes due to their configurations which include metal enclosures and pipelines that contain the material.

Thus, a heretofore unaddressed need exists in the industry to address the aforementioned deficiencies and inadequacies.

SUMMARY OF THE DISCLOSURE

Embodiments of the present disclosure provide an apparatus for measuring temperature in a layered environment. Briefly described, in architecture, one embodiment of the apparatus, among others, can be implemented as follows. An apparatus for measuring temperature in a layered environment includes an ultrasound transducer positioned perpendicular to an exterior surface of a first layer. The ultrasound transducer is in communication with a computer processor, power source, and computer-readable memory. The processor is configured to:
measure a thickness of the first layer; measure an exterior surface temperature of the first layer;
calculate an impedance of the first layer based on the thickness and the exterior surface temperature; and calculate an interior surface temperature of the first layer based on the impedance and the exterior surface temperature of the first layer.

The present disclosure can also be viewed as providing a system for measuring temperature in a layered environment. Briefly described, in architecture, one embodiment of the system, among others, can be implemented as follows. A first ultrasound transducer is positioned perpendicular to an exterior surface of a first layer at a first location. At least a second ultrasound transducer is positioned perpendicular to the exterior surface of the first layer at a second location. The first and at least second ultrasound transducers are in communication with a computer processor, power source, and computer-readable memory. The processor is configured to measure a thickness of the first layer at the first and at least second locations, measure an exterior surface temperature of the first layer at the first and at least second locations, and calculate an impedance of the first layer at the first and at least second locations based on the thickness and the exterior surface temperature. The processor is configured to determine a temperature gradient of a second layer between the first and at least second locations. The temperature gradient is calculated using the first and at least second ultrasound transducer. The present disclosure can also be viewed as providing methods of measuring a temperature in a layered environment. In this regard, one embodiment of such a method, among others, can be broadly summarized by the following steps: measuring a thickness of a first layer in at least one position; measuring a surface temperature of an exterior surface of the first layer at the at least one position; calculating an impedance of the first layer at the at least one position based on the thickness and the exterior surface temperature at the at least one position; calculating an interior surface temperature of the first layer at the at least one position based on the impedance and the exterior surface temperature at the at least one position; and determining at least one temperature gradient of a second layer in contact with the first layer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
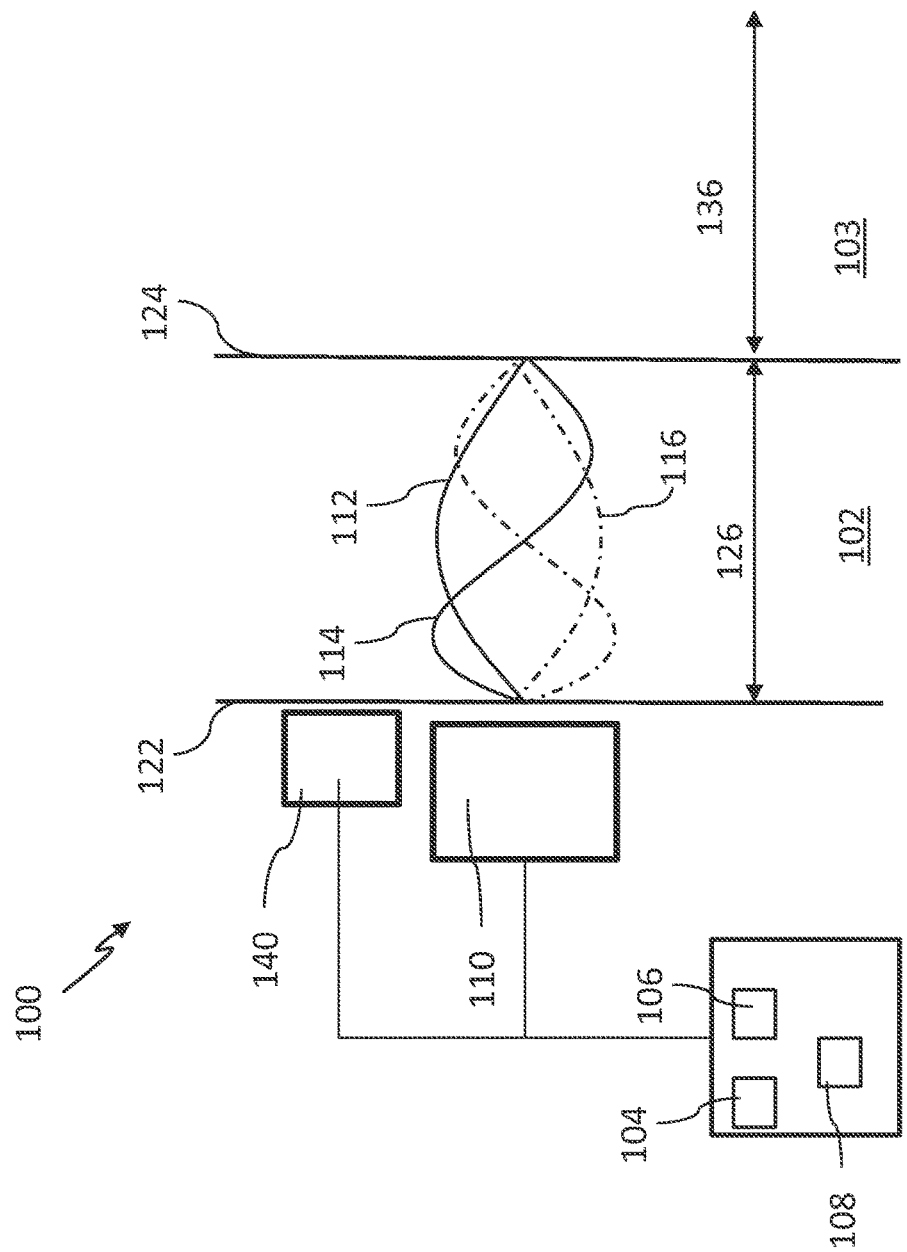
FIG. 1 is a cross-sectional diagrammatic illustration of an apparatus for measuring temperature in a layered environment, in accordance with a first exemplary embodiment of the present disclosure.

FIG. 1 is a cross-sectional diagrammatic illustration of an apparatus for measuring temperature in a layered environment ("apparatus") 100, in accordance with a first exemplary embodiment of the present disclosure. The apparatus 100 includes an ultrasound transducer 110 positioned perpendicular to an exterior surface 122 of a first layer 102. The ultrasound transducer 110 is in communication with a computer processor, power source, and computer-readable memory (not shown). The processor is configured to: measure a thickness 126 of the first layer 102; measure an exterior surface temperature of the first layer 102; calculate an impedance of the first layer 102 based on the thickness 126 and the exterior surface temperature; and calculate an interior surface temperature of the first layer 102 based on the impedance and the exterior surface temperature of the first layer 102.

The ultrasound transducer 110 may be any suitable transducer operating in the ultrasonic frequency range. In one example, the ultrasound transducer 110 may emit and receive ultrasound signals 112, 114, 116. The ultrasound transducer 110 may be in communication with a computer processor 104, power source 106, and computer-readable memory 108, as is known in the art. The power source 106 may provide power to the ultrasound transducer 110 and the processor 104. The computer processor 104 may control the ultrasound transducer 110 to operate by emitting an ultrasound signal 112, 114 or receiving an ultrasound signal 116. The received ultrasound signal 116 may be received by the processor 104 and stored within the computer-readable memory 108.

The ultrasound transducer 110 may be positioned substantially perpendicular to an exterior surface 122 of a first layer 102. In one example, the first layer 102 may be a pipe or container wall, for instance, made from cast iron or any other suitable material. The wall may surround and contain an amount of solid, semi-solid, liquid, or gas, which may create a second layer 103. The ultrasound transducer 110 may emit an ultrasound signal 112, 114 into the first layer 102 through the exterior surface 122 and the interior surface 124. The ultrasound signal 112, 114 may be used to perform a number of measurements of the first and second layers 102, 103.

Matter in any state (solid, liquid and gas) expands when heated. The atoms themselves do not expand, but the volume in which they exist expands. When a solid is heated, its atoms vibrate faster about their fixed points. The relative increase in the size of solids when heated is small in comparison with liquids and gasses. However, gases and liquids that are contained in a fixed volume cannot expand— and so increases in temperature result in increases in pressure. Air temperature can be determined from the speed of an ultrasonic wave using the following equation:

$$C=331+0.6*T$$

where T (in kg/m$^3$) is the temperature of the air, C (in m/s) is the speed of the ultrasound wave, and 331 is the constant speed of sound in air at freezing temperatures. The speed of sound is affected by other factors such as humidity and air pressure. Temperature is also a condition that affects the speed of sound. Heat, like sound, is a form of kinetic energy. Molecules at higher temperatures have more energy, thus they can vibrate faster. Since the molecules vibrate faster, sound waves can travel more quickly. The speed of sound in room temperature air is 346 meters per second. This is faster than 331 meters per second. When a liquid freezes or melts, the temperature stays the same even though heat energy is still being released to the surroundings. Therefore, as an example, the process of precipitation or melting of paraffin wax does not affect the temperature of crude oil in a pipeline. In solids, a major part of acoustic energy is dissipated from the ultrasound wave due to heat.

Acoustic velocity can be determined by the following equation:

$$C=\sqrt{(E/d)}$$

where d (in kg/m$^3$) is the density of a material, C (in m/s) is speed of the ultrasound wave, and E (in Pa, N/m$^2$) is the Bulk Modulus of Elasticity.

In a layered environment, the temperature can be measured at the beginning of each layer in combination with properties of the material in each layer. In one example, the number of layers may be used in determining the temperature of each layer. The number of layers may be determined by any suitable method, including acoustic detection, laser measurements, knowing the material composition previously, and the others.

In one example, the processor may be configured to control the transducer 110 to create one or more ultrasound signals 112, 114. A first ultrasound signal 112 may be used to determine the thickness of any layers 102, 103. It should be understood that two layers 102, 103 are shown for illustration; however, the systems and methods described herein may be used to determine the temperature and other characteristics of any number of layers, and are not limited by way of example. The first ultrasound signal 112, 114 may include ultrasonic waves of varying wavelengths. In one example, the wavelength may be tuned across the ultrasonic spectrum until a half-wavelength 112 or multiple of a half-wavelength 114 signal corresponds to the thickness 126 of the first layer. This may cause a standing wave to be established within the first layer 102, producing resonance. The ultrasound signal 112, 114 may resonate for frequencies that have half wavelengths in multiples of its thickness 126. An emitted ultrasound signal 112 may reflect off of the interior surface 124 of the first layer 102 and the reflected ultrasound signal 116 may be received by the ultrasound transducer 110. Furthermore, higher-level harmonic resonance may be used to determine thickness 126 with greater accuracy. The thickness 126 of the first layer 102 may be determined from the wavelength of any signals creating resonance and the speed of the ultrasonic wave within the first layer 102. The first ultrasound signal 112, 114 may be repeated in order to determine the thickness 136 of any subsequent layers, for instance, if a pipe wall comprises multiple coatings or layers. Each layer may resonate at specific frequencies that are indicative of the layer thickness. Emitted signals 112, 114 may be reflected and received as reflected signals 116 by the ultrasound transducer 110 in each case. All layers that are of the same size may resonate at the same frequencies, and their responses may be separated using the signal delay.

It should be noted that FIG. 1 is a diagrammatic illustration intended to show the principle of operation of the apparatus 100. Accordingly, the ultrasound signals 112, 114 and return signal 116 are illustrated as transverse waves, rather than longitudinal waves for clarity. It should be understood that the illustrated transverse waves are offered as an example to show partial-wavelength and multiple-wavelength frequencies propagating through the first layer 102, and do not indicate a transverse modulation in amplitude. One of skill in the art will understand that the ultrasonic waves 112, 114 described herein oscillate in a longitudinal direction.

It should be noted that the thickness 126 of the first layer 102 may be known from the manufacturer's specification, for instance, in the case of pipes. However, it is possible that corrosion or other forces may have caused deterioration of the first layer 102 in one or more places, and assuming the thickness 126 from a specification may not be accurate. Therefore, it may be necessary to measure the thickness 126 of the first layer using the acoustic resonance method described herein in order to accurately determine the temperature and other characteristics of other materials within the first layer 102.

The processor may next be configured to measure an exterior surface temperature of the first layer 102. The exterior surface temperature may be determined from the formulas provided above, based on the speed of the returned wave detected by the ultrasound transducer 110. In another example, one or more exterior temperature sensors 140 may be used. Next, the processor may be configured to calculate an impedance of the first layer 102 based on the thickness 126 and the exterior surface temperature. This may be done by measuring the reflected energy from the exterior surface 122 of the first layer 102 and factoring the measured value with the material density of the first layer 102, which may be known from the manufacturer's specifications.

Next, the processor may be configured to calculate an interior surface temperature of the first layer 102 based on the impedance and the exterior surface temperature of the first layer 102. This may be performed by measuring a time difference between a first echo or harmonic resonant reading detected by the ultrasound transducer 110 and a second echo detected by the ultrasound transducer 110. The time delay may allow the temperature of the interior surface 124 of the first layer 102 to be determined according to the following formula:

$$T_i = 2 * T_w - T_o$$

where $T_i$ is the temperature of the interior surface 124, $T_w$ is the temperature of the exterior surface 122, and $T_o$ is the ambient temperature.

Next, the processor may be configured to measure the amplitude of a return signal 116. By measuring the amplitude of the return signal 116, the attenuation of the signal may be determined. This may allow the processor to determine the location and impedance of the second layer 103, which may be understood from the following equation:

$$R = \left[\frac{(Z_{2L} - Z_{1L})}{(Z_{2L} + Z_{1L})}\right]^2$$

Where R is the reflection coefficient, $Z_{2L}$ is the impedance of the second layer 103, and $Z_{1L}$ is the impedance of the first layer 102. R, the reflection of coefficient, is a fraction with a value less than 1. When R is multiplied by 100, it represents the percentage of the reflected energy from impedance barrier between two materials.

It should be noted that attenuation and speed of the signal are unrelated. Overall attenuation is increased when frequency increases or path length increases. The intensity of an ultrasonic beam that is sensed by a receiving transducer is considerably less than the intensity of the initial transmission. Scattering of ultrasonic waves is one of the major factors responsible for loss of beam intensity, and it is occurring because the material in which the ultrasonic wave is travelling is not homogeneous. The inhomogeneity may be anything that will present a boundary between two materials of different acoustic impedance such as an inclusion or pores and possibly grain boundaries containing contaminants. Certain materials are inherently inhomogeneous, such as cast iron and paraffin wax, which are composed of a matrix of grains and graphite particles (in the case of cast iron) which differ greatly in density and elasticity. Each grain in the agglomeration has radically different acoustic impedance and consequently produces severe scattering. It is possible to encounter scattering in a material of just one crystal type if the crystals exhibit velocities of different values when measured along axes in different directions. A material of this type is said to be anisotropic. If individual grains are randomly oriented throughout a material, scattering will occur as if the material is composed of different types of crystals or phases. Materials exhibiting these qualities not only decrease the returned ultrasound signal because of scattering, but also often produce numerous small echoes which may mask or "camouflage" real indications.

Absorption of ultrasonic waves is the result of the conversion of a portion of the sound energy into heat. In any material not at absolute zero temperature the particles are in random motion as a result of the heat content of the material. As the temperature increases, there will be an increase in particle activity. As an ultrasound wave propagates through the material it excites the particles. As these particles collide with unexcited particles, energy is transmitted causing them to oscillate faster and through larger distances. This motion persists after the sound wave has passed on, so energy of the passing wave has been converted to heat in the material.

Figure 2:
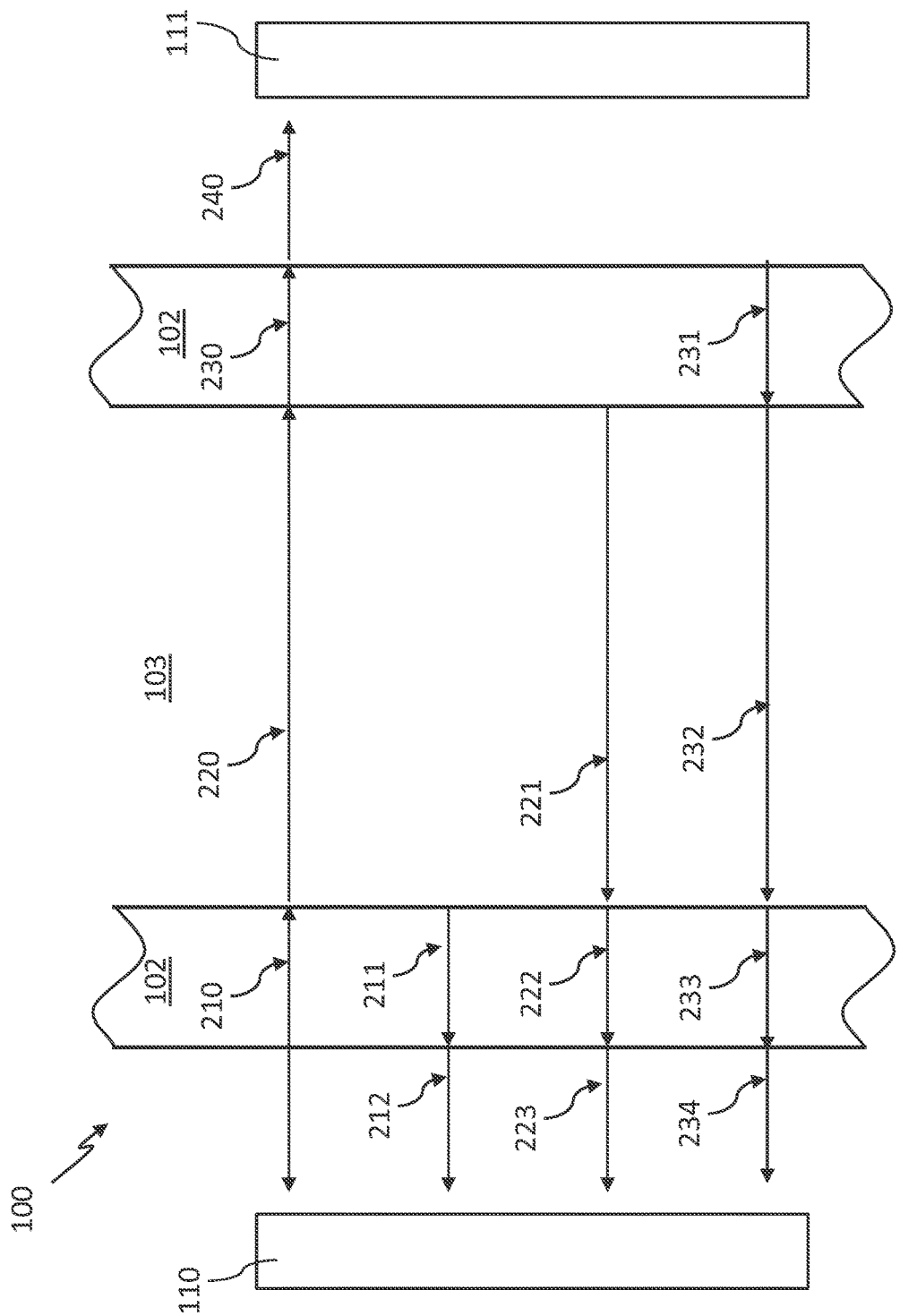
FIG. 2 is a diagrammatic illustration of the apparatus in operation, in accordance with the first exemplary embodiment of the present disclosure.

FIG. 2 is a diagrammatic illustration of the apparatus 100 in operation, in accordance with the first exemplary embodiment of the present disclosure. FIG. 2 illustrates the propagation of ultrasound signals through the first layer 102, second layer 103, and first layer (for instance, when the first layer 102 is a round pipe). One or more ultrasound transducers 110, 111 may be used to send and receive the signals as described relative to FIG. 1, above. FIG. 2 may further be understood relative to FIG. 1. Surfaces of the first and second layers 102, 103 have not been labeled to simplify the illustration.

In one example, a plurality of signals 210, 220, 230, 240 may result in a plurality of return signals or echoes 211, 212, 221-223, 231-234. Each echo 211, 212, 221-223, 231-234 may be useful in determining a property of the layers 102, 103 or the ambient environment. As can be seen from FIG. 2, signals 210, 220, 230, 240 may travel from a first ultrasound transducer 110 through the first layer 102, second layer 103, first layer 102, and into a second ultrasound transducer 111. At the boundary between each layer, the signals may reflect and/or propagate further. For example, a signal 210 traveling from the first ultrasound transducer 110 through the first layer 102 may reach the boundary between first and second layers 102, 103. The signal 210 may return toward the first ultrasound transducer 110 as echoes 211, 212. The signal 210 may continue as signal 220 through the second layer 103. When signal 220 reaches the boundary between the second layer and first layer 103, 102, the signal 220 may return toward the first ultrasound transducer 110 as echoes 221, 222, 223, each delineated by the boundaries between adjacent layers. The signal 220 may continue through the first layer 102 as signal 230. When signal 230 reaches the boundary between the first layer 102 and the second ultrasound transducer 111, it may return toward the first ultrasound transducer 110 as echoes 231, 232, 233, 234, each delineated by the boundaries between adjacent layers. Signal 230 may continue to the second ultrasound transducer 111 and be received and detected. Echoes 211, 212, 221-223, 231-234 may be received and detected by the first ultrasound transducer 110

TABLE 1

| | Layer Type Surface | | | | | | |
|---|---|---|---|---|---|---|---|
| | Transducer | Cast Iron | | | | | |
| | $Z_0$ | $Z_1$ | $Z_1$ | | Fluid $Z_2$ | | |
| Time | t0 | dt | t1 | dt2 | dt3 | dt4 | $dt_5$ |
| Attenuation | 100% | 99% 86% | 98% 87% | 10% 88% | 9% | 8% | 7% |

| | Layer Type Surface | | | | | | |
|---|---|---|---|---|---|---|---|
| | Fluid | | | | Cast Iron | | Transducer |
| | $Z_2$ | | | | $Z_1$ | $Z_1$ | $Z_0$ |
| Time | $dt_5$ | $dt_4$ | $dt_3$ | $dt_2$ | $t_1$ | dt | $t_0$ |
| Attenuation | 7% | 6% | 5% | 5% | 0.50% | | 0.05% |

As can further be seen from FIG. 2 and Table 1, above, the attenuation of the signal degrades significantly as the signal passes through the first and second layers 102, 103, in this example, cast iron and fluid layers, respectively. Passing through the first layer 102 initially, the signal has a 99% and 98% attenuation. Passing through the second layer 103, the signal degrades from 10% to 5% attenuation in relatively linear steps. Passing through the final first layer 102, the signal degrades to about 0.5% attenuation.

Figure 3A:
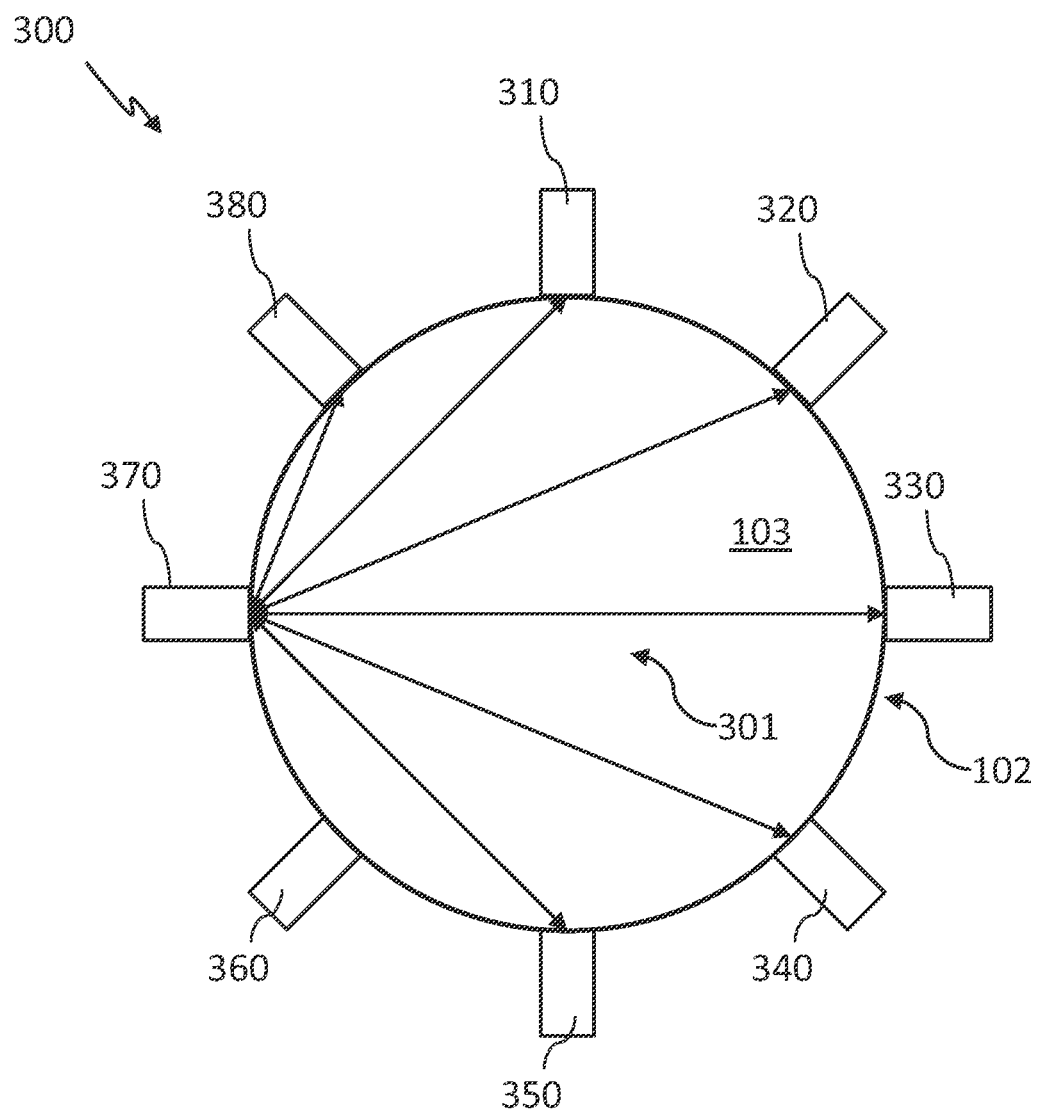
FIGS. 3A-3B are cross-sectional illustrations of a system for measuring temperature in a layered environment, in accordance with the first exemplary embodiment of the present disclosure.
Figure 3B:
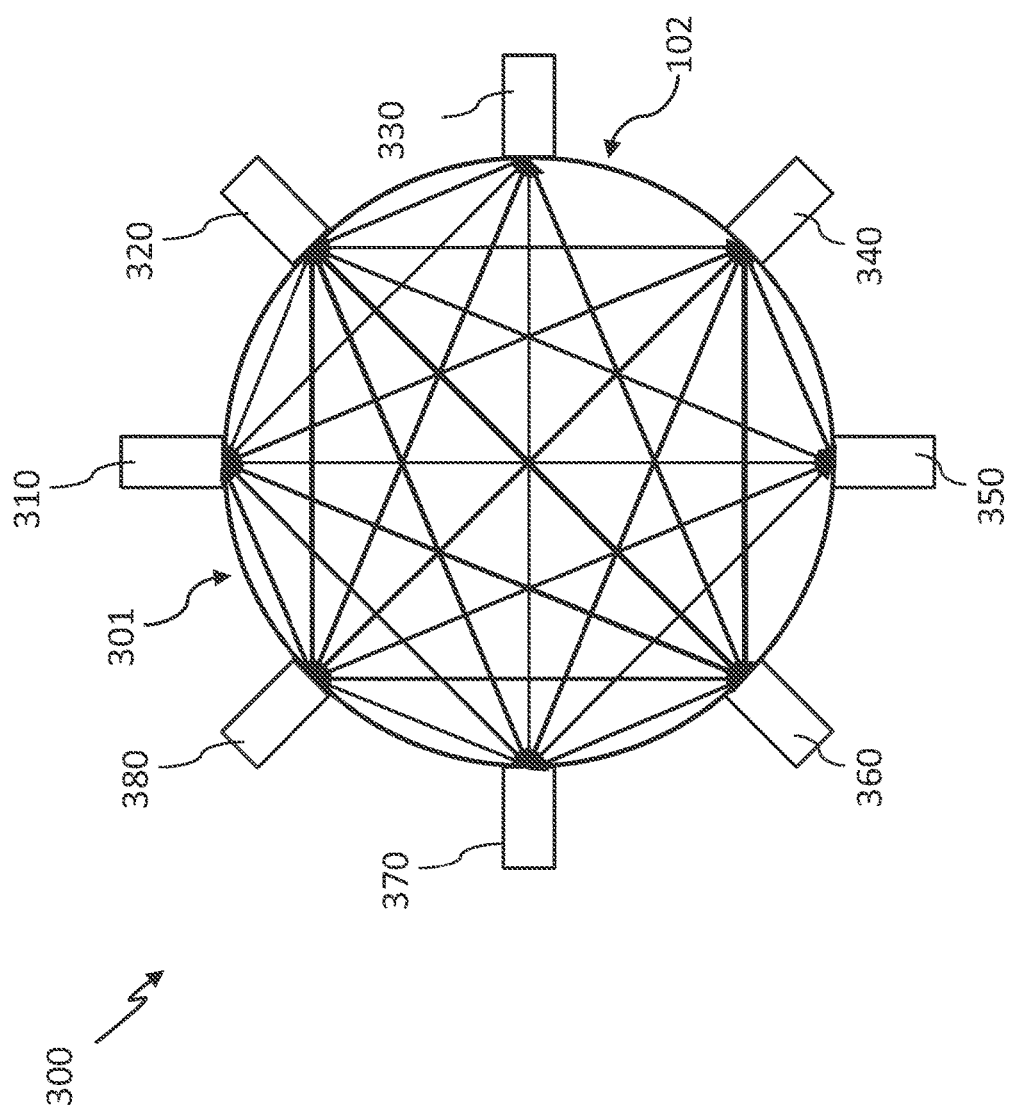

FIGS. 3A-3B are cross-sectional illustrations of a system for measuring temperature in a layered environment ("system") 300, in accordance with the first exemplary embodiment of the present disclosure. FIGS. 3A-3B show a plurality of ultrasound transducers 310-380 positioned perpendicular to a first layer 102, such as a pipe. The ultrasound transducers 310-380 may be in communication with at least one processor, power supply, and computer-readable memory as described above (not shown). The ultrasound transducers 310-380 are each located at a different position around the first layer 102. For example, the ultrasound transducers 310-380 may encircle the first layer 102 with a transducer located along each of a number of even divisions around the first layer 102, such that the ultrasound transducers 310-380 are separated about the exterior surface of the first layer 102 by even intervals. In another example, the ultrasound transducers 310-380 may be movable to different positions about the first layer 102. In one example, each transducer may be positioned directly opposite another transducer about the exterior surface of the first layer 102. For instance, ultrasound transducer 310 may be positioned opposite ultrasound transducer 350, and ultrasound transducers 320 and 360 may be positioned opposite one another, and so on. In another example, the ultrasound transducers 310-380 may be movable to be located opposite one another, or at any other suitable position relative to one another.

FIG. 3A shows that one ultrasound transducer 370 may emit ultrasound signals 301 to any number of the other ultrasound transducers 310-360, 380. The ultrasound signals 301 may be received by the other ultrasound transducers 310-360, 380 and processed to determine characteristics of the first layer 102 and the second layer 103, such as the layer thickness, exterior surface temperature, material impedance, interior surface temperature, and second layer temperature. This may be performed as described above. In one example, each ultrasound signal 301 emitted by an ultrasound transducer 310-380 may be reflected and received by the ultrasound transducer from which it originated to determine local material characteristics.

FIG. 3B illustrates that each ultrasound transducer 310-380 may emit ultrasound signals 301 to each other ultrasound transducer 310-380. The received ultrasound signals 301 may be processed to determine the desired characteristics of the first and second layers 102, 103. When a plurality of ultrasound transducers 310-380 are used, the system 300 may process the ultrasound signals 301 to determine a plurality of temperature gradients of the second layer 103. For instance, a temperature measured between transducers 310 and 350 may differ from the temperatures measured between transducers 320 and 360, 330 and 370, 340 and 380, and so on. This may be indicative of a local temperature nearer to a particular ultrasound transducer 310-380, as the temperature of the second layer 103 may not be even at all points within the second layer 103. Therefore, temperature values calculated between each ultrasound transducer 310-380 and each other ultrasound transducer 310-380 may correlate with local temperatures that gradually change throughout a cross-sectional area of the second layer 103. The processor may use these multiple temperature measurements to determine one or more temperature gradients within the second layer 103. In general, it is expected that the temperature at the center of the second layer 103 is higher than the temperature at the interior edge of the first layer 102.

With respect to FIGS. 1-3B, measurements may be performed at any suitable intervals. In one example, the ambient temperature may be monitored for changes, which may cause measurements to be performed again. In another example, data may be regularly sampled and the measurements performed again.

Additionally, ultrasonic tomographic imaging may be used to further map the temperature field within the first and second layers 102, 103. Tomographic imaging allows spatial variations of a physical variable in a material to be determined using only measurements made at the periphery of the area of interest. Ultrasonic waves may be propagated through the material in multiple directions, and a cross-sectional image may be reconstructed.

Resonant ultrasound spectroscopy may be employed using normal modes of elastic bodies to infer material properties such as elastic moduli and Q.

Figure 4:
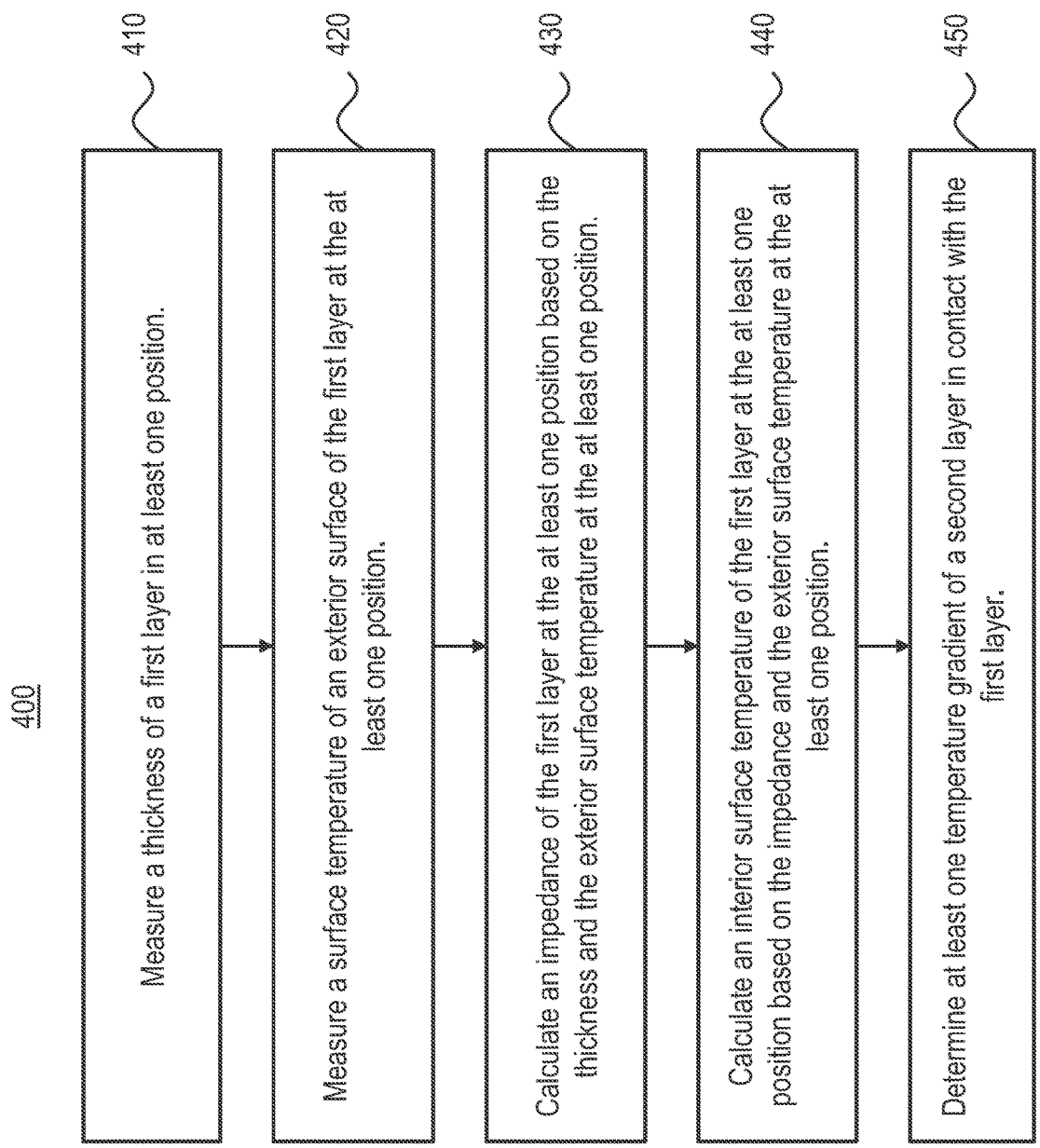
FIG. 4 is a flowchart illustrating a method of measuring a temperature in a layered environment, in accordance with the first exemplary embodiment of the present disclosure.

FIG. 4 is a flowchart 400 illustrating a method of measuring a temperature in a layered environment, in accordance with the first exemplary embodiment of the present disclosure.

It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 410 includes measuring a thickness of a first layer in at least one position. In one example, measuring the thickness of the first layer may include emitting, with an ultrasound transducer, an ultrasound signal between the exterior surface of the first layer and an interior surface of the first layer; and receiving, with the ultrasound transducer, the ultrasound signal reflected by the interior surface of the first layer. The ultrasound transducer may be selected, positioned, and operated as described above relative to FIG. 1. In one example, the ultrasound signal emitted by the ultrasound transducer may have a half-wavelength corresponding to the thickness of the first layer. This may cause a standing wave within the first layer, leading to resonance of the ultrasound signal within the first layer.

Step 420 includes measuring a surface temperature of an exterior surface of the first layer at the at least one position. In one example, measuring the surface temperature of the exterior surface may include determining, with the ultrasound transducer, a speed of the ultrasound signal; and correlating the speed of the ultrasound signal with a constant speed of sound in air at freezing temperatures. The speed of the ultrasound signal may be determined by analyzing the time required for the ultrasound transducer to receive a reflected signal after first emitting an ultrasound signal. This may be correlated with other material properties of the first layer and the determined thickness of the first layer in order to determine the distance traveled by the emitted and returned signals within the measured time.

Step 430 includes calculating an impedance of the first layer at the at least one position based on the thickness and the exterior surface temperature at the at least one position. In one example, calculating the impedance of the first layer may include measuring an energy of the reflected ultrasound signal; and factoring the measured energy with a material density value of the first layer.

Step 440 includes calculating an interior surface temperature of the first layer at the at least one position based on the impedance and the exterior surface temperature at the at least one position.

Step 450 includes determining at least one temperature gradient of a second layer in contact with the first layer.

The method may further include any other features, components, or functions disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An apparatus for measuring temperature in a layered environment, comprising:
   an ultrasound transducer positioned perpendicular to an exterior surface of a first layer, the ultrasound transducer in communication with a computer processor, power source, and computer-readable memory,
   wherein the processor is configured to:
   measure a thickness of the first layer;
   measure an exterior surface temperature of the first layer;
   calculate an acoustic impedance of the first layer based on the thickness and the exterior surface temperature; and
   calculate an interior surface temperature of the first layer based on the acoustic impedance and the exterior surface temperature of the first layer.

2. The apparatus of claim 1, wherein an ultrasound signal emitted by the ultrasound transducer has a half-wavelength corresponding to the thickness of the first layer.

3. The apparatus of claim 1, wherein measuring the thickness of the first layer comprises:
   emitting, with the ultrasound transducer, an ultrasound signal between the exterior surface of the first layer and an interior surface of the first layer; and
   receiving, with the ultrasound transducer, the ultrasound signal reflected by the interior surface of the first layer.

4. The apparatus of claim 3, wherein measuring the surface temperature of the exterior surface of the first layer at at least one position comprises:
   determining, with the ultrasound transducer, a speed of the ultrasound signal; and
   correlating the speed of the ultrasound signal with a constant speed of sound in air at freezing temperatures.

5. The apparatus of claim 4, wherein calculating acoustic impedance of the first layer at the at least one position comprises:
   measuring an energy of the reflected ultrasound signal; and
   factoring the measured energy with a material density value of the first layer.

6. A system for measuring temperature in a layered environment, comprising:
   a first ultrasound transducer positioned perpendicular to an exterior surface of a first layer at a first location; and
   at least a second ultrasound transducer positioned perpendicular to the exterior surface of the first layer at a second location, wherein the first and at least second ultrasound transducers are in communication with a computer processor, power source, and computer-readable memory, and wherein the processor is configured to:
   measure a thickness of the first layer at the first and at least second locations;
   measure an exterior surface temperature of the first layer at the first and at least second locations;
   calculate an impedance of the first layer at the first and at least second locations based on the thickness and the exterior surface temperature; and
   determine a temperature gradient of a second layer between the first and at least second locations, wherein the temperature gradient is calculated using the first and at least second ultrasound transducer.

7. The system of claim 6, wherein the first and at least second ultrasound transducers are positioned directly opposite one another about the exterior surface.

8. The system of claim 6, wherein the first and at least second ultrasound transducers are separated about the exterior surface by even intervals.

9. The system of claim 6, wherein the first ultrasound transducer emits an ultrasound signal that is received by the at least second ultrasound transducer after traveling through the first layer and second layer.

10. The system of claim 6, wherein the at least second ultrasound transducer emits an ultrasound signal that is received by the first ultrasound transducer after traveling through the first layer and the second layer.

11. The system of claim 6, wherein each ultrasound transducer emits an ultrasound signal that is received by every other ultrasound transducer after traveling through the first layer and the second layer.

12. The system of claim 6, wherein measuring a thickness of a first layer at the first and at least second locations comprises:
   emitting, with the first ultrasound transducer, a first ultrasound signal between an exterior surface of the first layer and an interior surface of the first layer;
   receiving, with the first ultrasound transducer, the first ultrasound signal reflected by the interior surface of the first layer;
   emitting, with the at least second ultrasound transducer, at least a second ultrasound signal between the exterior surface of the first layer and the interior surface of the first layer; and
   receiving, with the at least second ultrasound transducer, the at least second ultrasound signal reflected by the interior surface of the first layer.

13. The system of claim 12, wherein the first and at least second ultrasound signals have a half-wavelength corresponding to the thickness of the first layer at the first and at least second locations.

14. The system of claim 12, wherein measuring an exterior surface temperature of the first layer at the first and at least second locations comprises:
   determining, with the first and at least second ultrasound transducers, speeds of the first and at least second ultrasound signals; and
   correlating the speeds of the first and at least second ultrasound signals with a constant speed of sound in air at freezing temperatures.

15. The system of claim 14, wherein calculating an impedance of the first layer at the first and at least second locations comprises:
   measuring an energy of the reflected first and at least second ultrasound signals; and
   factoring the measured energy with a material density value of the first layer.

16. A method of measuring a temperature in a layered environment, comprising the following steps:
   measuring a thickness of a first layer at at least one position;
   measuring a surface temperature of an exterior surface of the first layer at the at least one position;
   calculating an acoustic impedance of the first layer at the at least one position based on the thickness and the exterior surface temperature at the at least one position;
   calculating an interior surface temperature of the first layer at the at least one position based on the acoustic impedance and the exterior surface temperature at the at least one position; and
   determining at least one temperature gradient of a second layer in contact with the first layer.

17. The method of claim 16, wherein the step of measuring a thickness of a first layer comprises:
   emitting, with an ultrasound transducer, an ultrasound signal between the exterior surface of the first layer and an interior surface of the first layer; and
   receiving, with the ultrasound transducer, the ultrasound signal reflected by the interior surface of the first layer.

18. The method of claim 17, wherein the ultrasound signal emitted by the ultrasound transducer has a half-wavelength corresponding to the thickness of the first layer.

19. The method of claim 17, wherein the step of measuring a surface temperature of an exterior surface of the first layer at the at least one position comprises:
   determining, with the ultrasound transducer, a speed of the ultrasound signal; and
   correlating the speed of the ultrasound signal with a constant speed of sound in air at freezing temperatures.

20. The method of claim 19, wherein the step of calculating the acoustic impedance of the first layer at the at least one position comprises:
   measuring an energy of the reflected ultrasound signal; and
   factoring the measured energy with a material density value of the first layer.

* * * * *